(12) United States Patent
Brisson et al.

(10) Patent No.: US 8,147,937 B2
(45) Date of Patent: Apr. 3, 2012

(54) REINFORCED ELONGATED ELEMENTS, SUCH AS TUBES, METHOD AND DEVICE FOR PRODUCING SAME AND USE THEREOF

(75) Inventors: Michel Brisson, Jurancon (FR); Guy Dupupet, Pau (FR); Jean Luyckx, Lons (FR)

(73) Assignee: Societe des Fibres de Carbone, Abidos (FR)

( * ) Notice: Subject to any disclaimer, the term of this patent is extended or adjusted under 35 U.S.C. 154(b) by 75 days.

(21) Appl. No.: 11/671,629

(22) Filed: Feb. 6, 2007

(65) Prior Publication Data

US 2007/0125488 A1  Jun. 7, 2007

Related U.S. Application Data

(63) Continuation-in-part of application No. PCT/FR2005/050615, filed on Jul. 25, 2005.

(30) Foreign Application Priority Data

Aug. 6, 2004  (FR) ..................................... 04 08724

(51) Int. Cl.
*B32B 1/08* (2006.01)
*B32B 23/00* (2006.01)
(52) U.S. Cl. ..................... 428/36.3; 428/34.1; 428/34.2; 428/35.7; 428/36.9; 428/36.91
(58) Field of Classification Search ................. 428/34.1, 428/34.2, 35.7, 36.9, 36.91, 36.3
See application file for complete search history.

(56) References Cited

U.S. PATENT DOCUMENTS

| 3,998,458 | A | * | 12/1976 | Inoue et al. | .................... 473/319 |
| 4,077,828 | A | * | 3/1978 | Strom | ........................... 156/429 |
| 5,088,735 | A | * | 2/1992 | Shigetoh | ...................... 473/320 |
| 5,370,796 | A | * | 12/1994 | Grimwood | ................ 210/360.1 |
| 5,397,365 | A | * | 3/1995 | Trentacosta | ............... 623/18.11 |
| 5,419,554 | A | * | 5/1995 | Krone et al. | .................. 473/535 |
| 5,897,447 | A | * | 4/1999 | Nishihara | ..................... 473/535 |
| 6,233,862 | B1 | * | 5/2001 | Tsurufuji et al. | .......... 43/18.1 R |
| 6,605,171 | B1 | | 8/2003 | Debalme et al. | |
| 6,955,024 | B2 | * | 10/2005 | Ashton | ........................... 52/843 |

FOREIGN PATENT DOCUMENTS

| EP | 0122884 | 10/1984 |
| FR | 2031719 | 11/1970 |
| GB | 1024307 | 10/1962 |
| GB | 2431134 | 4/2007 |
| JP | 02040408 | 2/1990 |
| JP | 911355 | 1/1997 |
| JP | 2003243333 | 8/2003 |
| WO | 9420285 | 9/1994 |

OTHER PUBLICATIONS

Merriam Webster's Dictionary, Tenth Edition, Merriam Webster, p. 219.*

* cited by examiner

*Primary Examiner* — Marc Patterson
(74) *Attorney, Agent, or Firm* — Lucas & Mercanti, LLP

(57) ABSTRACT a reinforced elongate element (12) comprises a core (22) of elongate shape covered by at least one layer (33) of composite material comprising a plurality of tapes (32) wound at a settable winding angle around said core (22), each of the tapes (32) being made using glass or carbon threads or fibers (35) embedded in a matrix (34) of thermoplastic resin. The elongate element may be in the form of very long tubes suitable for use off-shore.

19 Claims, 4 Drawing Sheets

US 8,147,937 B2

REINFORCED ELONGATED ELEMENTS, SUCH AS TUBES, METHOD AND DEVICE FOR PRODUCING SAME AND USE THEREOF

This application is a Continuation In Part application of PCT/FR2005/050615 filed on Jul. 25, 2005, designating USA, and published under N° WO 2006/021711.

FIELD OF THE INVENTION

The invention relates to the technical field of fabricating elongate elements such as tubes, e.g. off-shore tubes.

STATE OF THE PRIOR ART

Until now, very heavy steel tubes have been fabricated that present problems of corrosion at sea, and that are also difficult to weld.

Document FR-A-2 031 719 (Société du Verre Textile) filed on Feb. 5, 1969 discloses a method and a device for obtaining composite products made of fibers agglomerated by synthetic resins, in particular by thermoplastic resins.

The method and the device described in that document make it possible directly to prepare section members that are solid or tubular and regardless of their section.

Sekisui JP HEI 2-40408 of Feb. 20, 1990=JP-A-03/243, 333 discloses the manufacture of small diameter PVC tubes having an inner diameter of 23 millimeters and a wall thickness of 3 millimeters. The coating of the core tube is made with thermoplastic composite tapes, having a thickness of 0.5 millimeters and a width of about 20 millimeters, and consisting of loose spun glass fibers impregnated with a specific PVC resin having a critical content of 62% in chlorine. The amount of fibers is of 30% by volume in the composite tape. It also appears that the winding angle of the tape on the tube core is fixed or constant for the full tape depositing procedure on the full length of the tube.

Debalme U.S. Pat. No. 6,605,171 B1 is based on a technology requiring rotation of the tube with a fixed length and depositing a starnd with overlapping of layers, see FIGS. 1A and 2A thereof.

Isolcell EP-0,122,884 is a similar background prior art document

OBJECTS OF THE INVENTION

The new technical problem to be solved is to be able to fabricate elongate objects, and notably tubes, of very great length, in general limited only by the dimensions of the factory or possibly of transport.

Concerning the invention, it is possible to fabricate elongate objects, notably tubes, having a length greater than 30 meters (m), and possibly as long as 100 m or even more.

The invention is not restricted to fabricating elongate objects, notably tubes, of circular cross-section, but can be used for fabricating members of other sections, such as members of flat or square section, masts for boats, blades for wind turbines.

The invention also makes it possible to fabricate elongate objects, notably tubes, in a manner that does not depend on the shape of the cross-section. The shape may be arbitrary.

Another technical problem that the invention seeks to solve is fabricating an elongate object, notably a tube, with a resin that is thermoplastic as opposed to thermosetting, and in particular fabricating off-shore, notably underwater or underseawater tubes, as well as wind turbines blades.

The invention thus seeks to replace heavy steel elongate objects, notably tubes, that present problems of corrosion and that are also difficult to weld.

In an off-shore structure of metal type, beyond a certain length, e.g. a depth of 1500 m, weight becomes so great that such structures can no longer withstand their own weight.

The invention also enables that problem to be solved.

The invention further seeks to solve the new technical problem of manufacturing elongate objects, notably tubes and in particular off-shore tubes, having varying traction resistance and/or pressure resistance, notably in the longitudinal direction of the tube.

SUMMARY OF THE INVENTION

In a first aspect, the invention covers as a novel product, a reinforced elongate element defining a longitudinal axis comprising a core of elongate shape coated with at least one layer of composite material comprising a plurality of tapes wound around said core, each of the tapes being made from reinforcing threads or fibers, e.g. glass or carbon threads or fibers, embedded in a matrix of thermoplastic resin, the tapes are wound around the core at a predetermined settable winding angle relative to the longitudinal axis of the elongate element, depending on the mechanical strength desired for the intended application. The reinforcing threads or fibers are preferably continuous. Thus, the threads or fibers are advantageously of great length, generally corresponding substantially to the length of the tape.

In the context of the invention, the thermoplastic resin is itself commercially available in the form of granules. Concerning the fabrication of the tape used in the invention, it is possible to use the method and the apparatus as described in above-mentioned document FR-A-2 031 719. Naturally other techniques for fabricating tape of this type could be used.

Concerning the use of thermoplastic resin, its mechanical strength is much greater compared with using thermosetting resin, in particular in terms of impact resistance.

The use of thermoplastic resin also makes it easier to make elongate objects of complex shapes, notably with hollows or cavities, like tubes.

Since the invention fabricates elongate elements such as tubes or tubular elements out of a thermoplastic resin, their use must be restricted to locations in which the temperature does not exceed 100° C., i.e. either in the ground, or at sea where an advantageous application lies in the off-shore industry, in particular for oil installations.

When making elongate objects, notably tubes, that may be as long as 100 m or more, the objects or tubes can be subsequently connected to one another by connector devices that may be made of metal so as to ensure perfect sealing, such devices being commercially available, in particular from the supplier Freyssinet International located in France.

In a variant embodiment, the said core of elongate shape is made of a metal or a metal alloy, in particular steel, preferably stainless steel.

In another variant embodiment, the core is made of a thermoplastic material, in particular "nylon", preferably of the same kind as the thermoplastic resin used for making the matrix of the tape.

In yet another variant embodiment, the thermoplastic resin includes or is constituted by polyamide 11 or polyamide 12.

In yet another advantageous embodiment of the invention, the core presents a shape that is essentially convex.

In a presently preferred embodiment, the core of elongate shape mainly or essentially presents a hollow tubular shape of the tube type.

In an advantageous embodiment of the invention, the tapes are wound around the core at a predetermined settable angle relative to the longitudinal axis of the elongate element, depending on the mechanical strength desired for the intended application.

For example, said settable angle lies in the range from 20° to 85° as measured relatively to the longitudinal axis of the elongate element, and can advantageously be progressively modified from a first end to the second end of the elongate element. For applications of the "off-shore type", the intended angle presently lies in the range from 20° to 80° or 20° to 70° as measured relatively to the longitudinal axis of the elongate element, and can advantageously be progressively modified from a first end to the second end of the elongate element.

For "wind-turbine blade" type applications, the intended angle presently lies in the range from 20° to 85° as measured relatively to the longitudinal axis of the elongate element, and can advantageously be progressively modified from a first end to the second end of the elongate element.

Contrarily to filament winding process that is mainly used for the manufacturing of pipes and complex forms (U.S. Pat. No. 6,605,171 B1 and JP 03 243333 A, EP-A-0 122 884), the invention manufacturing process, due to a settability of the tape winding angle, allows to change the angle of fiber composite tape deposition on the tube or the complex form. The angle can be modified at the start of the production process, as well as during the process according to the needs of the piece that is manufactured.

It is well known that composites are considered as anisotropic materials and relating to the claims of the present invention, a variation of angles is important to lead the strength in the ideal and required way relating to the end use application. Filament winding process of corresponding U.S. Pat. No. 6,605,171 B1 and JP 03 243333 A, EP-A-0 122 884 patents do not allow to have change of strengths due to angle variation, as this prior art process only works with fixed angles. Besides, filament winding process only allows limited range of angles such as for instance 50° to 55°, when an important angle is required, or close to 90° when a very low angle is required in order to get thickness of the composite.

The present invention allows a wide variety of angles from 0° to 85° or even 90°, with a possibility to combine different angles from 0° to 85° during the manufacturing process according to the specific constraints such as pressure resistance, flexural strength, tensile strength, related to each application like offshore, windmill.

For instance, if an offshore application is considered, notably for risers, the head of the seawater tube is submitted to high strength mechanical effects as it has to support the whole weight of the tube. In such a case, the winding angle has to be minimal, that is close to the longitudinal axis of the elongate element, here a tube, for instance in a range of about 20 to 25°. But on the other hand, this same head part doesn't need to have a high resistance to pressure constraints as it is not located in the depth of the sea. Conversely, if the bottom of the tube that is in the deep sea is considered, the forces or constraints are opposite and the bottom part needs a high resistance to pressure constraints due to sea depth especially for deep offshore where there is a high risk of tube collapse, and low mechanical strength resistance as there is few or no weight to support. In this latter case, the winding angle has to be high, for instance in a range of about 60-80°, or 60-70° relative to the longitudinal axis of the tube.

The same winding angle principle applies for other mechanical objects like wind turbine blades, where the torsion forces are maximum at the connexion proximal end and the winding angle is therefore high, for example in the range of 80-85° relative to a longitudinal axis; whereas the traction forces are maximum at the free distal end of the blade and the winding angle is accordingly low, for instance in a range of 20-25° relative to the longitudinal axis of the elongate element constituted here by a wind turbine blade.

With all the invention elongate elements, let it be tubes like off-shore riser tubes, or wind turbine blades, the winding angle is progressively modified all during the manufacturing process to vary smoothly from a low winding angle to a high winding angle or vice versa.

Accordingly, in the intermediate zone, the winding angle is intermediate.

According to a specific embodiment of the invention process, thanks to the possibility of winding angle variation all through the manufacturing process, the winding angle value is managed by the speed ratio between translation displacement of the tube and the rotation of the tapes. The winding angle is in particular given by the following mathematical formula:

$$\alpha = \text{Arctan}(\Pi \times D \times N / Vt)$$

α: Angle in Degrees relative to the core longitudinal axis
D: Core diameter in meter
N: Tape or cassette rotation speed in rpm
Vt: Core translation displacement speed in meter/minutes.

Thus, one skilled in this Art will understand that the invention unexpectedly enables to manufacture a sole composite part that comprises a wide variety of angles and therefore specific resistance to strengths or constraints that are useful to specific applications.

Taking into account another example such as windmill blades, the head of the blade is submitted to very high strength efforts and needs therefore specific resistance to strength. On the other hand, the end of the blade has quite few strength effort to support, but needs to be resistant to bending efforts. Hence, manufacturing the blade thanks to the invention technology enables to put strength and effort resistance in the appropriate place of the part of the blade and to keep the deformation of the blade under control when it will be in function.

Additionally, according to a particular invention embodiment, the tension of the tape is set according to the winding angle value.

According to the invention, the tension of the tape is set by providing braking means onto each cassette on which are stored the tape by being rolled thereon.

One skilled in the art will understand that by varying the braking force on the cassette, the tension of the tape can be set at the desired value.

Besides, the process enables a progressive evolution from one angle to a different angle all through the process. For instance, for an angle of about 20°, the tension of the tape would be preferably of about 15 DecaNewton; and for an angle of about 70°, the tension of the tape would be preferably of about 5 DecaNewton.

In an advantageous embodiment, it is possible to provide at least one and preferably a plurality of layers of composite material of the same structure or composition or of different structures/compositions, in particular tapes that are different or that are disposed at different winding angles.

In another particular embodiment, it is possible to provide at least one layer made of a composite material comprising a thermoplastic resin and using threads or fibers, e.g. glass threads or fibers, as reinforcement, it being possible to wind said threads or fibers at predetermined winding angles about the preceding layer.

In yet another advantageous embodiment, provision is made for the outermost layer on the elongate element to be made of composite material comprising a plurality of tapes also wound around the preceding layer, said tape comprising a matrix of thermoplastic resin and reinforcement in the form of threads or fibers, e.g. glass or carbon threads or fibers.

By means of the invention, it is no longer necessary to have a protective layer for protecting the elongate element, the layer of thermoplastic composite material itself constituting a protective layer because of its mechanical strength, in particular its impact resistance.

In impact resistance testing, it will be found that for thermosetting resins of the "epoxy" type, the energy needed to achieve rupture is generally one-fifth of the energy needed to rupture thermoplastic resins. This demonstrates the advantage of being able to make elongate elements with thermoplastic resins as in the present invention.

In a second aspect, the present invention also provides a method of fabricating reinforced elongate elements, the method being characterized in that it comprises:

a. providing a support element for supporting a core of elongate shape defining a longitudinal axis, the support element including displacement means for moving the core of elongate shape in translation;

b. providing at least one cassette and advantageously a plurality of cassettes for storing tapes made of composite material comprising a matrix of thermoplastic resin having embedded therein threads or fibers, e.g. threads or fibers of glass or carbon;

c. providing rotary drive means for setting each cassette into rotation;

d. providing settable winding angle means for adjusting the winding angle of each tape relatively to said longitudinal axis, around said core.

e. providing synchronization means for synchronizing the displacement in translation of the core of elongate shape and the means for setting each tape-containing cassette into rotation;

f. providing at least one heater device for heating thermoplastic resin to a temperature greater than its melting temperature during a period of time that is sufficient to ensure complete melting of the thermoplastic resin and bonding of the layer of composite material on said core or on the preceding layer;

g. implementing synchronized displacement in translation of the core of elongate shape and winding at a predetermined settable angle of at least one tape by putting at least one cassette for storing tape into rotation;

h. causing a layer to be formed either by unreeling a sufficient number of tapes to form said layer, or by implementing a plurality of passes in translation of said core to enable said tapes to be wound; and i. after said heating, cooling or allowing to cool, thus obtaining the reinforced elongate element.

Optionally, the operation of depositing an additional layer or a plurality of layers can be begun again using tapes of a different or structure or composition.

According to an invention embodiment, the winding angle or core value is managed by the speed ratio between translation displacement of the core and the rotation of the tape or of the cassette storing the tape. The winding angle is in particular given by the following mathematical formula:

$$\alpha = \text{Arctan}(\Pi \times D \times N / Vt)$$

α: Angle in Degrees relative to the core longitudinal axis
D: Core diameter in meter
N: Tape or cassette rotation speed in rpm
Vt: Core translation displacement speed in meter/minutes.

Taking into account another example such as windmill blades, the head of the blade is submitted to very high strength efforts and needs therefore specific resistance to strength. On the other hand, the end of the blade has quite few strength effort to support, but needs to be resistant to bending efforts. Hence, manufacturing the blade thanks to the invention technology enables to put strength and effort resistance in the appropriate place of the part of the blade and to keep the deformation of the blade under control when it will be in function.

In an advantageous implementation of the method of the invention, a plurality of successive devices are provided for supporting cassettes of said tapes in order to deposit a plurality of layers of composite material during a single movement in translation of the element of elongate shape.

In an advantageous implementation of the invention, each tape is wound with predetermined tension per tape so that when the thermoplastic resin is melted, the threads or fibers embedded in the resin of each tape are caused to automatically shift towards the center and thus towards the core by an internal tension effect, thereby obtaining a pressing effect against the core or the preceding layer.

Additionally, according to a particular invention embodiment, the tension of the tape is set according to the winding angle value. Besides, the process enables a progressive evolution from one angle to a different angle all through the process. For instance, for an angle of about 20°, the tension of the tape would be preferably of about 15 DecaNewton; And for an angle of about 70°, the tension of the tape would be preferably of about 5 DecaNewton.

The tension of the type can be set at a value as low as 1 DecaNewton for common applications.

According to one particular invention embodiment, the tension of the tape is provided by a braking action to brake the rotation speed of each cassette on which is rolled the tape.

Accordingly, one skilled in the art will easily understand, with the invention, by such a braking action, the tension is easily settable at a precise value and be varied to follow the winding angle value.

According to the invention, the heater device for heating the thermoplastic resin is provided with a settable orientation so as to avoid overheating the core or the preceding layer in order to avoid degrading it. This is obtained in the invention by maintaining the settable orientation of the hot fluid flow, preferably an air flow, of the heater device in a direction substantially perpendicular to the tape irrespective of its current winding angle. One skilled in the art will understand that fluids other than air are usable like inert gas although they are usually more expansive.

In an advantageous implementation of the invention, the heating is implemented with the help of nobles delivering hot fluid, preferably hot air, at a temperature that is not less than the melting temperature of the thermoplastic resin used.

The invention thus makes it possible to use hot air alone which is naturally less aggressive relative to the matrix than a flame as is used in the prior art and is further safe as compared to other fluids.

In an advantageous implementation of the invention, an elongate element is used that is of tubular shape and of arbitrary polygonal or circular section, and that is advantageously hollow so as to form tubes or pipes for transporting material, such as a fluid, and in particular, optionally-liquid gas or oil.

The invention is not restricted to a particular shape of elongate element since by using tapes they can be matched closely to any geometrical shape. Nevertheless, the invention is advantageously used for reinforcing cores that are essentially convex in shape, i.e. that do not include any hollows in their outer surface, since it is extremely difficult to apply said tapes to said hollows.

In a third aspect, the invention also provides an apparatus for fabricating reinforced elongate elements, comprising:

a. providing a support element for supporting a core of elongate shape defining a longitudinal axis, the support element including displacement means for moving the core of elongate shape in translation;

b. providing at least one cassette and advantageously a plurality of cassettes for storing tapes made of composite material comprising a matrix of thermoplastic resin having embedded therein threads or fibers, in particular threads or fibers of glass or carbon;

c. providing rotary drive means for putting each cassette into rotation;

d. providing settable winding angle means for adjusting the winding angle of each tape relative to said longitudinal axis, around said core.

e. providing synchronization means for synchronizing the displacement in translation of the core of elongate shape and the means for putting each tape-containing cassette into rotation;

f. providing at least one heater device for heating thermoplastic resin to a temperature greater than its melting temperature during a period of time that is sufficient to ensure complete melting of the thermoplastic resin and bonding of the layer of composite material on said core or on the preceding layer;

g. providing control means for synchronized control of said synchronization means for synchronizing the movement in translation of the core of elongate shape and of the means for setting each tape storage cassette into rotation; the control means being provided either to wind a number of tapes that is sufficient to form at least one layer of composite material comprising a plurality of tapes wound around the core of elongate shape, or to perform a plurality of passes in translation of said core in order to wind said tapes; and h. said control means being provided to control each heater device to heat to a temperature greater than a melting temperature of the thermoplastic resin during a period of time that is sufficient to melt completely the thermoplastic resin and bond a layer of composite material on said core or on the preceding layer.

With the apparatus of the invention, in order to accelerate cooling of the resulting reinforced elongate element, it is possible to provide cooling means downstream from the heater device(s).

In a variant embodiment of the apparatus of the invention, the apparatus can be designed to allow the operation to be started again in order to deposit an additional layer or a plurality of layers with tapes of a different kind. In this context, provision can also be made for at least one second assembly comprising at least one cassette and advantageously a plurality of cassettes for storing tapes, either identical in structure/composition or of different structures/compositions.

Thus, in an advantageous embodiment of the apparatus of the invention, a plurality of successive devices are provided for supporting cassettes of said tapes, so as to make an element of elongate shape in a single movement in translation with a plurality of layers of composite materials deposited thereon.

According to a particular invention embodiment, the winding angle value is managed by the speed ratio between translation displacement of the core and the rotation of the tape or of the cassette storing the tape. The angle is in particular given by the following mathematical formula:

$$\alpha = \text{Arctan}(\Pi \times D \times N / Vt)$$

α: Angle in Degrees relative to the core longitudinal axis
D: Core diameter in meter
N: Tape or cassette rotation speed in rpm
Vt: Core translation displacement speed in meter/minutes.

Thus, one skilled in this Art will understand that the invention unexpectedly enables to manufacture a sole composite part that comprises a wide variety of angles and therefore specific resistance to strengths or constraints that are useful to specific applications, as above said for the method.

All the embodiments given for the method are clearly applicable to the apparatus.

In another advantageous embodiment of the apparatus of the invention, tension adjustment means can be provided for adjusting the winding tension of each tape to a predetermined tension value, e.g. by providing for said tension adjustment means to enable adjustment to be performed on a desired traction force, such that while the thermoplastic resin is melted, the threads or fibers embedded in the resin of each tape are automatically shifted towards the center and thus towards the core, by adding an internal tension effect, thereby achieving an effect of pressing against the core or the preceding layer.

According to a particular invention embodiment, each tension adjustment means comprises braking means capable of exerting a braking action on each cassette on which is rolled the tape.

With the tension adjustment means, in particular comprising braking means, it is very easy to set the tension of the tape according to the winding angle. For instance, for an angle of about 20°, the tension of the tape would be preferably of about 15 DecaNewton; and for an angle of about 70°, the tension of the tape would be preferably of about 5 DecaNewton. It can also be provided a tension of the tape of about 1 DecaNewton (1 kg) per tape for common elongate objects.

In an advantageous embodiment of the invention, the heater device for heating the thermoplastic resin is foreseen with settable orientation means for settable orientation of a hot fluid flow to avoid overheating the core or the preceding layer in order to avoid degrading it.

According to another particular invention embodiment, the apparatus comprises settable orientation maintaining means to maintain the settable orientation of the hot fluid flow of the heater device in a direction substantially perpendicular to the tape irrespective of its current winding angle.

In yet another advantageous embodiment of the apparatus of the invention, provision can be made for the heater device to comprise nozzles delivering hot air at a temperature that is not less than the melting temperature of the thermoplastic resin used.

In a fourth aspect, the present invention also covers the use of the above-mentioned reinforced elongate elements, in particular as obtained by the method of the invention or from the fabrication apparatus of the invention, in order to fabricate pipes, notably riser pipes, for burying in the ground or for use off-shore, in particular extending from an off-shore platform to the sea bottom.

It can thus be understood that the invention does indeed enable the above-specified technical problems to be solved, and consequently provides a solution that is novel and not obvious to the person skilled in the art.

Other objects, characteristics, and advantages of the invention appear clearly in the light of the following explanatory description made with reference to a presently preferred embodiment of an apparatus of the invention, and enabling the above-described method of the invention to be implemented, the embodiment being given purely by way of illustration and thus not limiting the scope of the invention in any way.

The apparatus of the invention is shown in the accompanying figures, and forms an integral part of the invention, and as a result any characteristic of the apparatus that appears to be novel over any state of the art is claimed both as general means and functionally, as are technical equivalents thereof.

In the examples, temperatures are given in degrees Celsius, the pressure is atmospheric pressure, and the atmosphere is air unless specified to the contrary.

DETAILED DESCRIPTION OF THE BEST MODE OF THE INVENTION

Figure 1:
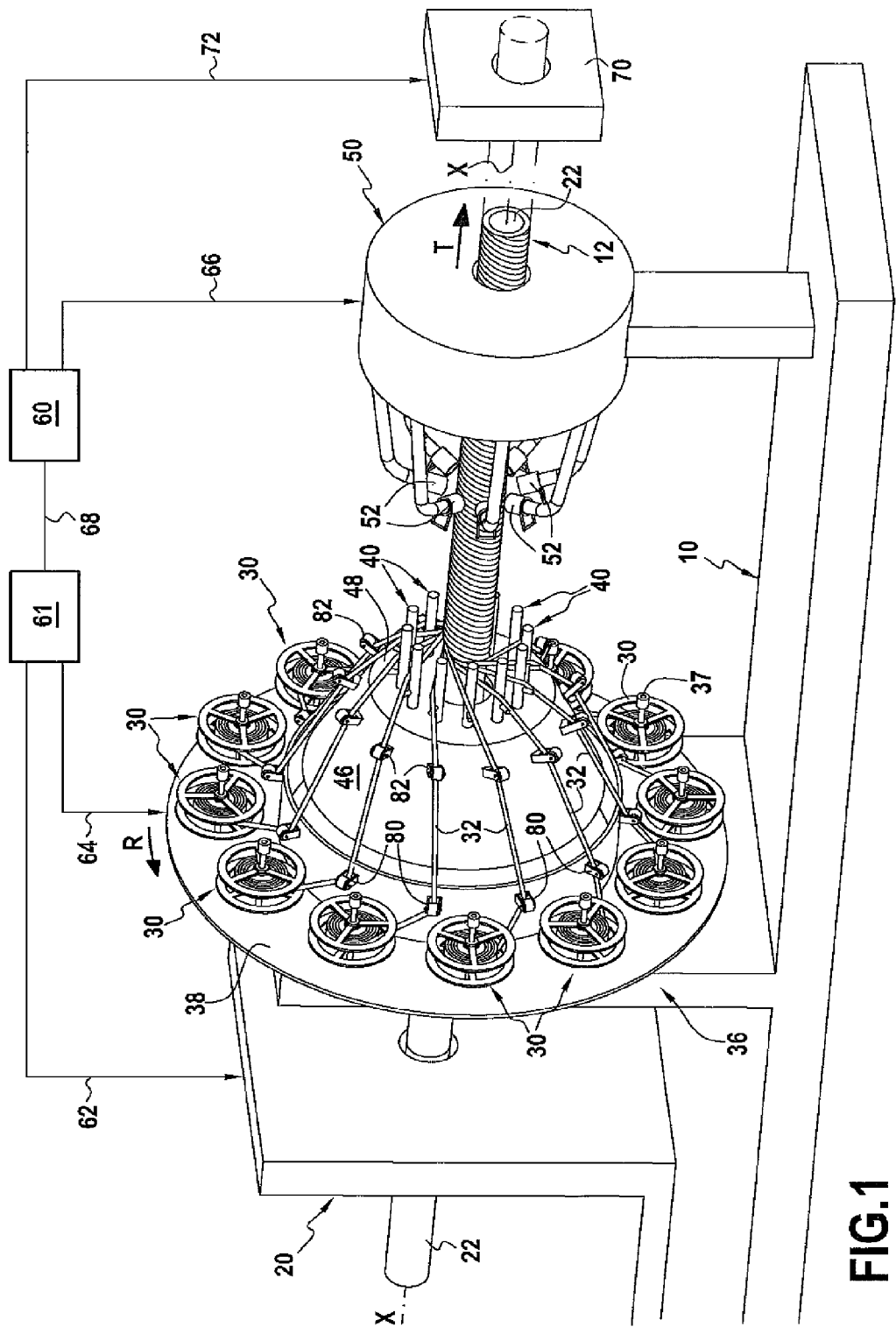
FIG. 1 is a simplified overall side view of a first embodiment of an apparatus of the invention, given by way of illustration.
Figure 2:
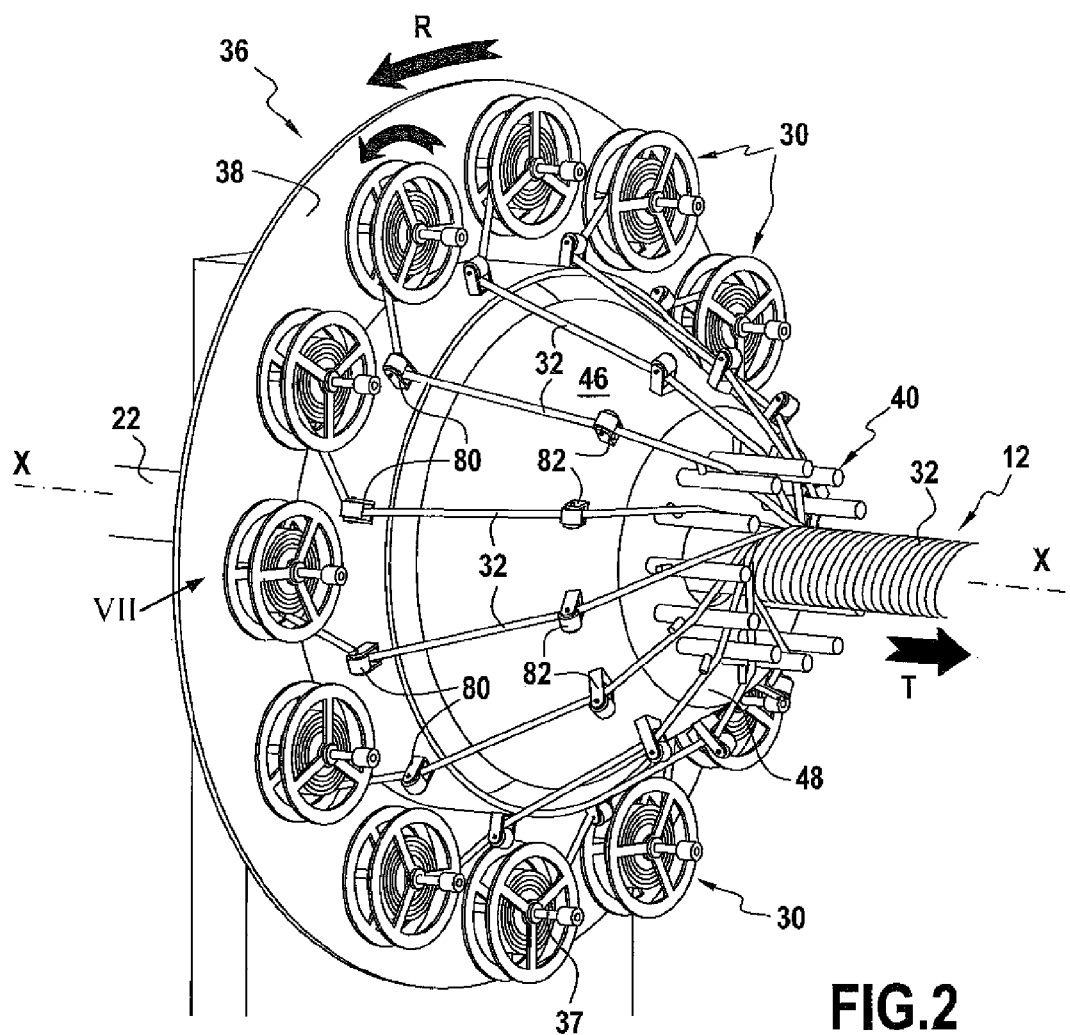
FIG. 2 is an enlarged view of a portion of the apparatus made in accordance with the invention and showing the means for imparting rotation, e.g. in the form of a wheel or turntable, serving to support the tape-containing cassettes.
Figure 5:
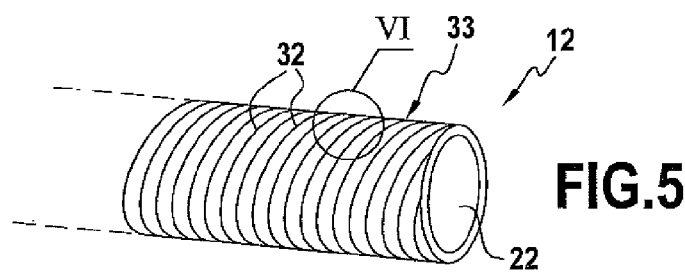
FIG. 5 shows the detail of a reinforced element of elongate shape obtained by the invention with a layer made up of a plurality of tapes 32.
Figure 6:
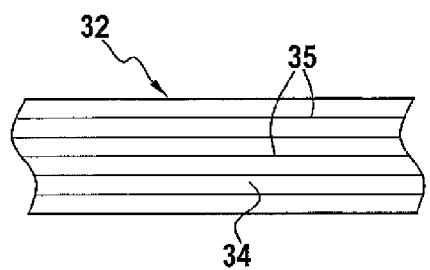
FIG. 6 is a detail view referenced VI in FIG. 5 showing the construction of a tape made by combining a matrix of thermoplastic material and reinforcing threads or fibers, e.g. threads or fibers of glass or carbon.
Figure 3:
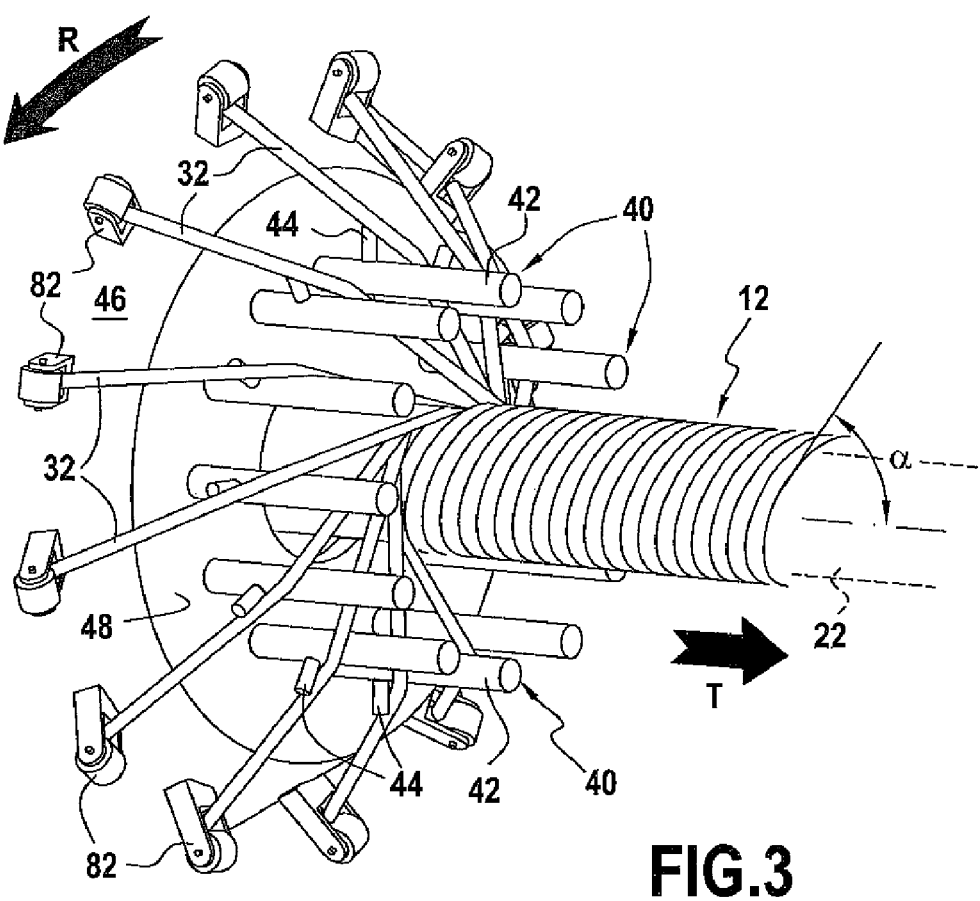
FIG. 3 is an enlarged view of a portion of the apparatus made in accordance with the invention showing the detail of the operation of laying the tapes contained in the cassettes.
Figure 4:
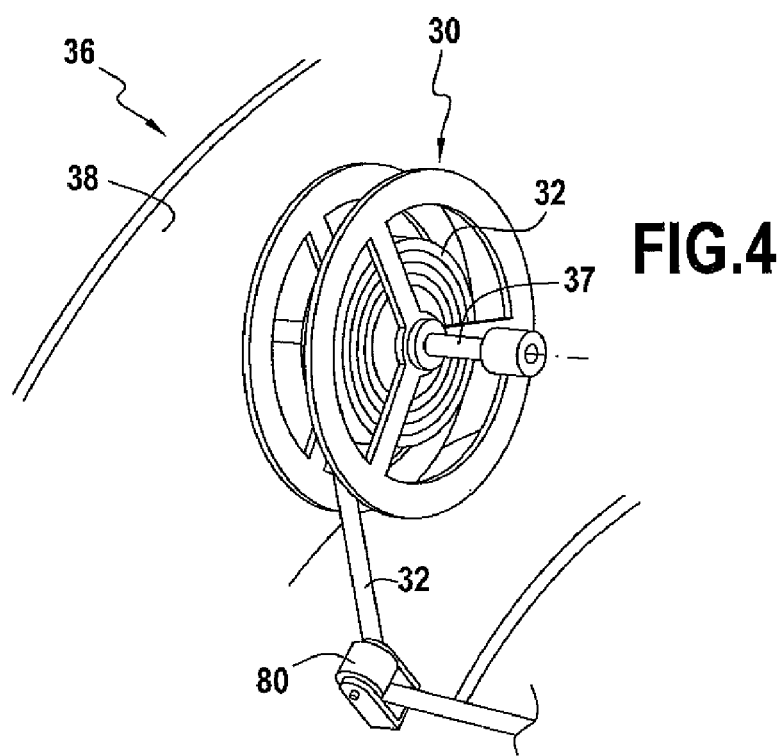
FIG. 4 shows the detail of a cassette, showing clearly how the tape is stored reeled on the cassette and how it is unreeled.

With reference to FIGS. 1 to 7, an apparatus of the invention is given overall reference number 10 and is characterized in that it comprises:

a. Providing a support element 20 for supporting a core 22 of elongate shape, having displacement means enabling said core of elongate shape to be moved in translation T, said displacement means being well known to the person skilled in the art and therefore not shown therein.

b. Providing at least one cassette 30, and advantageously a plurality of cassettes 30 (here 12) for storing tapes 32 made of composite material comprising a matrix (34) of thermoplastic resin having reinforcing threads or fibers (35) embedded therein, e.g. glass or carbon threads or fibers.

c. Providing rotary drive means 36 for each cassette 30, said rotary drive means 36 comprising for example a rotary shaft 37 about which the cassettes 30 are free to rotate. In the presently preferred embodiment shown in FIG. 1, the rotary shafts 37 are themselves supported by a turntable 38, itself set into rotation by conventional rotary drive means well known to the person skilled in the art. These elements together constitute the rotary drive means 36 for each cassette 30.

d. Providing settable winding angle means constituted here by the combination of the rotary drive means 36, turntable 38 and the rotation speed of the cassettes 30, for adjusting the winding angle for each tape around said core 22.

e) providing synchronization means (61) well known to the person skilled in the art, and in order to simplify the figure, are represented herein by displacement means 20 for moving the core 22 of elongate shape in translation, and means 36 for imparting rotary drive to each tape-containing cassette 30, by the presence of two respective connections 62 and 64.

f. Providing at least one heater device 50 for heating the thermoplastic resin 34 to a temperature higher than its melting temperature during a length of time that is sufficient to achieve complete melting of the thermoplastic resin and bonding of the layer 33 of composite material on said core 22 or on the preceding layer.

g. Providing control means 60 for synchronized control over a connection 68 of the synchronization means 61, the means 20 for moving the core 22 of elongate shape in translation, and the means 36 for imparting rotary drive to each tape-containing cassette 30.

These control means 60 are designed:
either to unreel a number of tapes 32 that is sufficient to form at least one layer 33 of composite material comprising a plurality of tapes wound around the core 22 of elongate shape (as shown in FIG. 1 and even more visible in FIGS. 2 and 3);
or else to perform a plurality of passes in translation of said core so as to wind said tapes in equivalent manner and as is easily understood by a person skilled in the art.

h. The control means 60 are also designed to act over a connection 66 to cause each heater device 50 to take up a temperature greater than a melting temperature of the thermoplastic resin 34 during a length of time that is sufficient to melt the thermoplastic resin 34 completely and bond a layer 33 of composite material on said core 22 or on the preceding layer.

Figure 7:
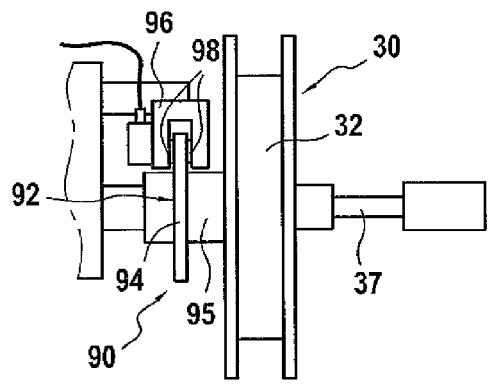
FIG. 7 is a detail view referenced VII in FIG. 2 of the cassette showing the presence of tension adjusting means which according to this particular embodiment comprise braking means.

As clearly shown on FIG. 7, tension adjusting means 90 can be provided for adjusting the winding tension of each tape 32 to a predetermined tension value, which enables adjustment to be performed on a desired traction force such that while the thermoplastic resin is melted, the threads of fibers embedded in the resin of each tape 32 are automatically shifted towards the centre and thus, towards the core or the preceding layer, by adding an internal tension effect.

According to a particular invention embodiment, each tension adjustment means comprises braking means or brake 92 capable of exerting a braking action on each cassette 30 on which is rolled the tape 32.

Of course, the structure of each brake is of any type which can be used to exert a braking action on the cassette 32.

According to the embodiment shown on FIG. 7, the brake 92 comprises a braking disk 94 which can be braked by friction disks 98 forming part of an electromechanical braking activation device 96 which can be U shaped to be on both sides of the braking disk 94

It is apparent that the braking disk 94 is mounted here on a cylinder 95 linked to the cassette 30 to rotate with it. Of course, the braking disk 94 can be directly mounted onto the cassette 30 and sidely braked as is understandable for one skilled in the art.

It is well understood by one skilled in the art that with the tension adjusting means 90, in particular comprising braking means 92, it is very easy and very effective to set a tension of the tape 32 according to the winding angle α at any wished value.

Figure 8:
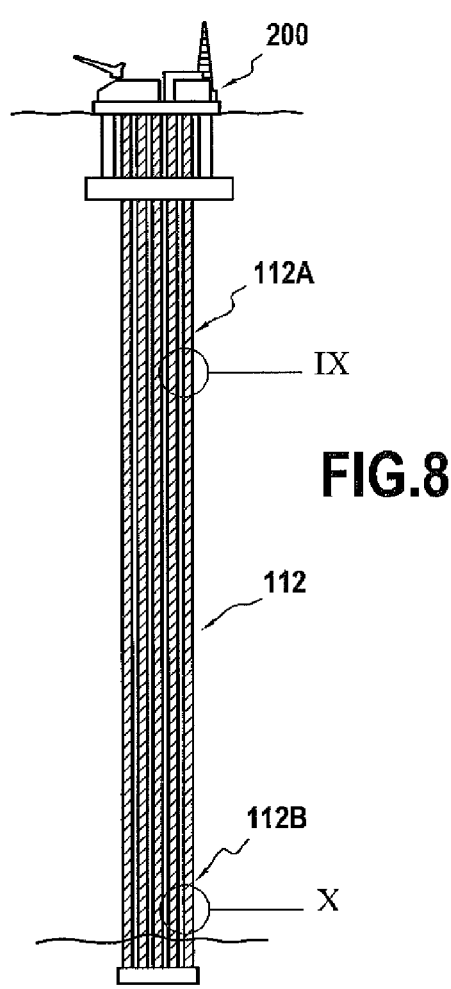
FIG. 8 shows a second embodiment of an elongate element in the shape of an off-shore tube 112 manufactured according to the process and apparatus of the invention, a plurality of 5 tubes being gathered together to constitute risers for offshore platforms to withdraw for instance natural oil or petroleum from a well underground the sea bottom.

For instance, for the manufacture of an offshore tube which can be used as one riser 112 as shown on FIG. 8 of an offshore platform 200, the invention permits to vary the winding angle at will by managing the speed ratio between the translation displacement of the tube or core 22 and rotation of the tapes 32 as given by the mathematical formula previously set forth.

Figures 9, 10:
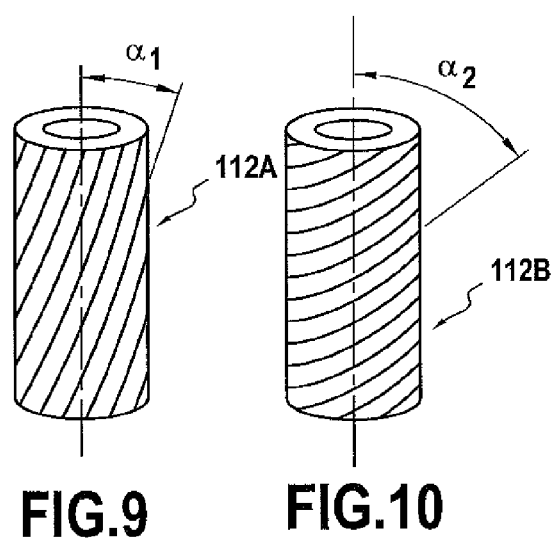
FIG. 9 shows a section of the tube 112 at the riser top position shown by arrow IX of FIG. 8 with the winding angle $\alpha 1$ of the tape relative to the longitudinal axis X-X of the tube 112.
FIG. 10 shows another part of the tube at the bottom level of the riser according to arrow X of FIG. 8 with the winding angle $\alpha 2$ relative to longitudinal axis X-X of the tube.

For the riser zone 112A shown in FIG. 9, which is aimed to be in a rather top position of the riser, strong traction forces are exerted by the weight of the tubes which can have a length usually from more than 100 meters to 1000 meters or even more.

In the top zone 112 A where the tractions forces are the highest, the winding angle can be set at a rather small value, namely in the range of about 20-25° as shown by the value α1 on FIG. 9; whereas in the bottom part of the riser where the pressures are the highest due to the deep sea level, the winding angle α2 as shown on FIG. 10 is set at a high value, namely here in a range of 60-70°, for instance 65°.

Of course, the winding angle is modified smoothly or progressively from the small value to the high value in order to avoid any sharp change in winding angle which could cause or promote mechanical deficiencies in the tube.

Figure 11:
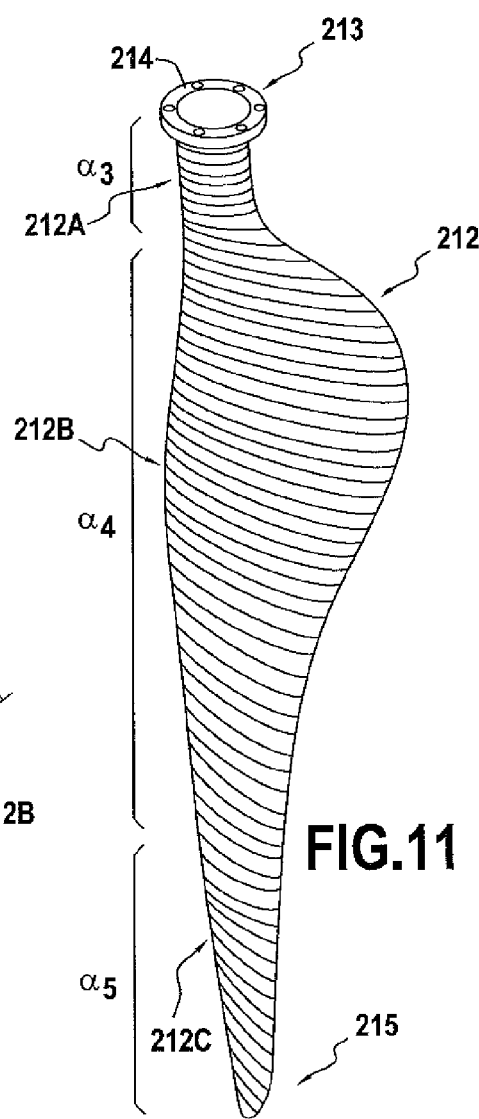
FIG. 11 shows another invention embodiment of an elongate element constituted here by a wind turbine blade 212, for example for wind energy machines, showing the respective winding angles $\alpha 3$, $\alpha 4$, $\alpha 5$ from the connexion proximal end to the free distal end.

Similarly, with regard to FIG. 11, it is shown a third embodiment of elongate element here in the shape of a wind turbine blade 212.

This wind turbine blade 212 has a proximal end 213 which bears a connection means 214 to enable fixation onto the turbine axle and a distal end 215. As well understood for one skilled in the art, at the proximal end 213, in the zone 212A, the torsion forces are at the maximum and in this respect, it is preferred to have a winding angle α3 as high as possible, close to be perpendicular to the longitudinal axis X-X of the blade, namely in the range of 80-90°, particularly about 85°, whereas at the free end 215, in zone 212C, the traction forces are maximum and it is preferred to have a low winding angle value, for instance in the range of 20-25°, called winding angle α5.

As previously said for the other riser embodiment, the intermediate zone 112 has a winding angle α4 intermediate which can be in the range of 45-50°, whereas there is a progressive change of the winding angle α from the proximal zone 212A with winding angle α3 and distal zone 212C having winding angle α5.

Therefore, it is easily understood that the invention enables to adapt the manufacture of the elongate element to any particular use.

In the context of the invention, in order to accelerate the cooling of the resulting reinforced elongate element, cooling means 70 may be provided downstream from the heater means 50, as is readily understandable for a person skill in the art. The control means 60 are also advantageously designed to control the cooling means 70 via an appropriate connection 72.

In an advantageous embodiment of an apparatus of the invention, the apparatus 10 may be designed to enable the operation to be restarted in order to deposit an additional layer or a plurality of layers using tapes 32 of different kinds. In this context, it is possible to provide at least one second assembly 38 having at least one cassette 30 and advantageously a plurality of cassettes 30 for storing tapes 32 either of identical kind or of different kinds.

It can thus readily be understood that in an advantageous embodiment of the apparatus of the invention, a plurality of successive devices 38 or turntables are provided for supporting cassettes 30 for storing tapes 32 so that an element 12 of elongate shape can be made during a single movement in translation with a plurality of layers of composite material being deposited thereon, whether the layers are identical in kind or of different kinds.

In yet another advantageous embodiment of the apparatus of the invention, provision can be made for further tension adjusting means such as 80, 82 for adjusting tension to a predetermined tension value in the reel of each tape 32, e.g. by providing tension adjustment means 80, 82 enabling an adjustment to be made on a traction force of about 1 decanewton (1 kilogram) per tape 32, such that when the thermoplastic resin 34 melts, the threads or fibers embedded in the resin of each tape 32 are automatically shifted towards the center and thus towards the core by an internal tension effect, thereby pressing them against the core or the preceding layer. The turntable 38 may also have a frustoconical portion 46 supporting the means 82, together with a disk-forming element 48 supporting the means 40 for guiding the tapes 32, e.g. comprising rods 42 and studs 44 (see FIG. 3).

According to a further invention embodiment the heater device 50 is provided with settable orientation means for maintaining the settable orientation of the hot fluid flow of the heater device in a direction substantially perpendicular to the tape irrespective of its current winding angle to avoid overheating the core or the preceding layer in order to avoid degrading it.

In yet another advantageous embodiment of the apparatus of the invention, provision can be made for each heater device 50 to comprise nozzles 52 delivering hot air at a minimum temperature greater than the melting temperature of the thermoplastic resin 34 used. These nozzles 52 may naturally be made so as to be steerable or orientable, thereby enabling them to be oriented at an appropriate angle of orientation for diffusing the hot air under the best heating conditions, as hereabove just mentionned.

Various embodiments of the elongate element 12, 112, 212 and in particular of the core 22 and of the tapes 32 are described in the introductory portion of the description.

It is apparent that, in the invention, the translation of the core is performed essentially parallel to the longitudinal axis of the core. Depending from the core shape, other translation direction could be foreseen.

It can thus be understood that the invention makes it possible to solve the above-specified technical problems and consequently it presents a solution that is novel and not obvious to a person skilled in the art. The invention, as described above for the apparatus, also enables the method of fabricating the elongate element 12 reinforced by at least one layer 33 to be implemented in the manner described above in the introductory portion of the present description.

As specified above, the invention also covers any means constituting technical equivalents of the means described and shown in the accompanying figures which form integral portions of the invention.

The invention claimed is:

1. A reinforced offshore pipe defining a longitudinal axis, having two main ends, a first proximal end aimed to be close to the water surface and a second distal end aimed to be located in the depth of the water, comprising a core of elongate shape externally coated with at least one layer of composite material extending continuously from the first proximal end to the second distal end, the composite material comprising at least one tape wound outside and around said core, each of the at least one tape being made from reinforcing threads or fibers embedded in a matrix of thermoplastic resin, each of the at least one tape is wound around the core at a predetermined settable winding angle relative to the longitudinal axis of the elongate element, the winding angle for the at least one tape varying from the first proximal end to the second distal end along the longitudinal axis, thereby varying the mechanical strength from the first proximal end to the second distal end of the offshore pipe.

2. A reinforced offshore tube defining a longitudinal axis, having two main ends, a first proximal end aimed to be close to the water surface and a second distal end aimed to be located in the depth of the water, comprising a tubular core of elongate shape externally coated with at least one layer of composite material comprising at least one tape wound outside and around said core, each of the at least one tape being made from reinforcing threads or fibers embedded in a matrix of thermoplastic resin, each of the at least one tape is wound around the core at a predetermined settable winding angle relative to the longitudinal axis, the winding angle for the at least one tape, from the first proximal end to the second distal end, varying progressively along the longitudinal axis from a winding angle of 20 to 25° in the vicinity of the first proximal end to a winding angle of 60 to 80° near the second distal end, thereby varying the mechanical strength from the first proximal end to the second distal end of the offshore tube.

3. The reinforced offshore tube of claim 2, wherein the winding angle value is managed by the speed ratio between translation displacement of the core and the rotation of the tape or of a cassette storing the tape.

4. The reinforced offshore tube of claim 2, wherein the winding angle is given by the following mathematical formula:

$$\alpha = \text{Arctan}(\Pi \times D \times N / Vt)$$

α: Angle in Degrees relative to the core longitudinal axis
D: Core diameter in meter
N: Tape or cassette rotation speed in rpm
Vt: Core translation displacement speed in meter/minutes.

5. The reinforced offshore tube of claim 2, wherein the at least one tape wound around the core under a tension of the tape set according to the winding angle value.

6. The reinforced offshore pipe of claim 1, wherein said winding angle has been progressively modified from the first proximal end to the second distal end of the offshore pipe.

7. The reinforced offshore tube of claim 5, wherein, for an angle of about 20°, the tension of the tape is set to about 15 DecaNewton, and for an angle of about 70°, the tension of the tape is set to about 5 DecaNewton.

8. The offshore tube of claim 2, wherein said core of elongate shape is made of a metal or a metal alloy.

9. The offshore tube of claim 2, wherein the core comprises a thermoplastic material.

10. The offshore tube of claim 2, wherein the core is made of a thermoplastic resin comprising or is essentially consisting of nylon.

11. The offshore tube of claim 2, wherein the core comprises thermoplastic resin essentially of the same kind as the thermoplastic resin used for making the matrix of the tape.

12. The offshore tube of claim 2, wherein the thermoplastic resin comprises or is consisting of polyamide 11 or polyamide 12.

13. The offshore pipe of claim 1, wherein the winding angle lies in the range from 20° to 80° and varies progressively along the longitudinal axis from the first proximal end to the second distal end of the offshore pipe.

14. The offshore tube of claim 2, comprising a plurality of layers of composite material of different structures, each of the at least one tape is being selected from tapes of different structure or from tapes wound with different winding angles, or a combination of both.

15. The offshore tube of claim 2, comprising several of said composite layers, the outermost layer on the elongate element being made of composite material comprising at least one tape also wound around the preceding layer, the at least one tape comprising a matrix of thermoplastic resin and reinforcement in the form of threads or fibers.

16. A reinforced offshore pipe defining a longitudinal axis, having two main ends, a first proximal end aimed to be close to the water surface and a second distal end aimed to be located in the depth of the water, comprising a core of elongate shape externally coated with at least one layer of composite material comprising at least one tape wound outside and around said core, each of the at least one tape being made from reinforcing threads or fibers embedded in a matrix of thermoplastic resin, each of the at least one tape is wound around the core at a predetermined settable winding angle relative to the longitudinal axis, the winding angle for the at least one tape varying from the first proximal end to the second distal end along the longitudinal axis, said winding angle ranging between 20 and 25° near one among the first proximal end and of the second distal end, thereby varying the mechanical strength from the first proximal end to the second distal end of the off shore pipe.

17. The reinforced offshore pipe of claim 1, wherein the at least one tape is a plurality of tapes wound simultaneously outside and around the core at said predetermined settable winding angle relative to the longitudinal axis.

18. The reinforced offshore tube of claim 2, wherein the at least one tape is a plurality of tapes wound simultaneously outside and around the core at said predetermined settable winding angle relative to the longitudinal axis.

19. The reinforced offshore tube or pipe of claim 16, wherein the at least one tape is a plurality of tapes wound simultaneously outside and around the core at said predetermined settable winding angle relative to the longitudinal axis.

* * * * *